Patented Aug. 9, 1927.

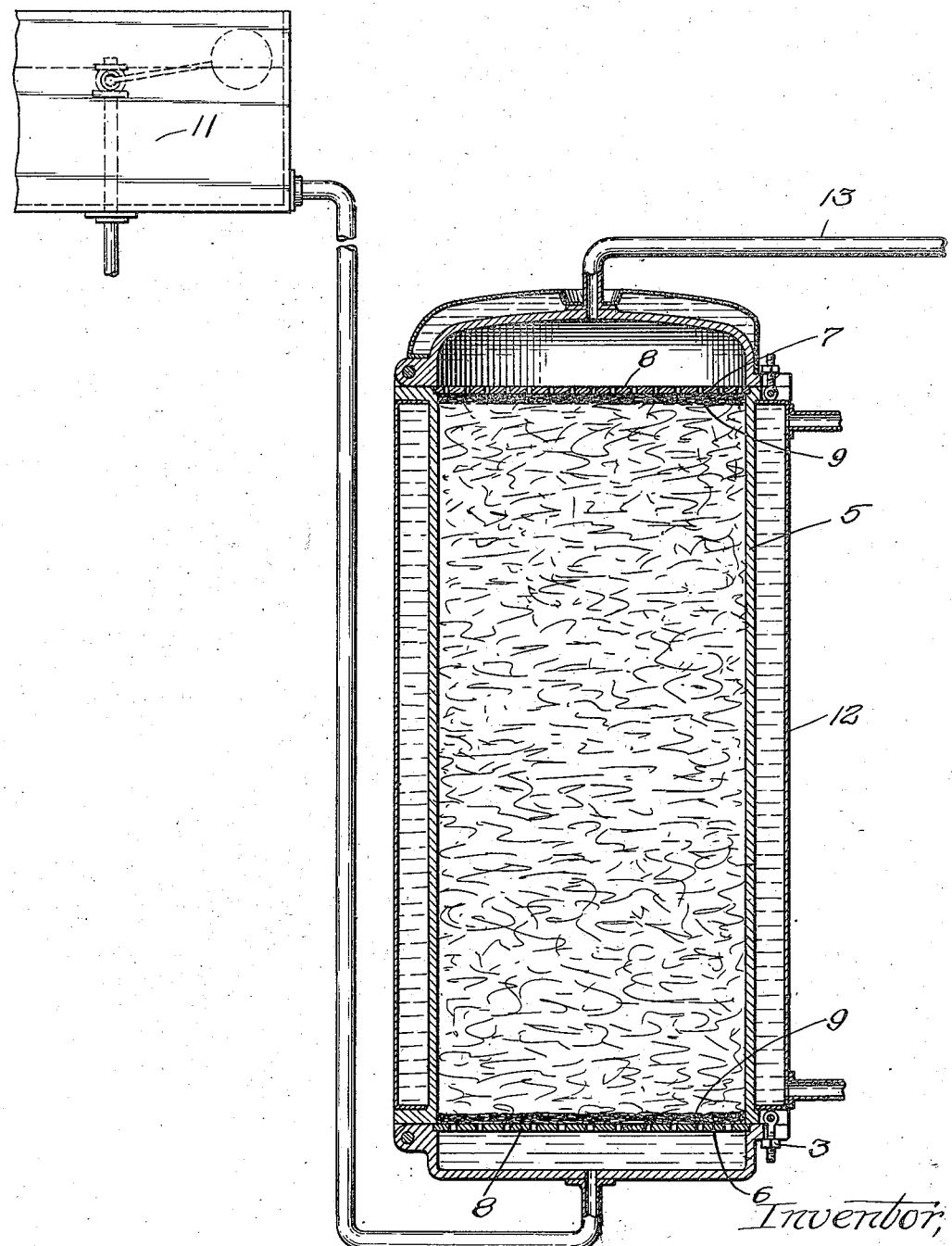

1,638,530

UNITED STATES PATENT OFFICE.

WILLIAM HOSKINS, OF CHICAGO, ILLINOIS.

REMOVING OIL FROM OIL-BEARING MATERIALS.

Application filed March 1, 1922. Serial No. 540,346.

The present invention relates to the removal of oils or fatty materials from material containing them and will be fully understood from the following description, illustrated by the accompanying drawing, in which apparatus suitable for carrying the invention into effect is diagrammatically shown.

The oil-bearing material, for example copra, is comminuted and is then packed into a vertical chamber 5 between porous septums 6 and 7. These septums may suitably be formed of perforated metal plates 8 against which a fibrous material, such as asbestos, is preferably evenly packed although such fibrous material may be dispensed with. In packing the comminuted oil-bearing material into the chamber between septums it may be introduced a small amount at a time and is uniformly distributed and packed down by rams or the like. The packing of the comminuted material apparently causes an exudation of oil to the surfaces of the particles and the formation of a continuous phase of oily material between the particles.

After the comminuted oily material has been introduced into the chamber in the manner described, water or other liquid is introduced into the chamber through one of the septums, for example, through pipe 10 below the lower septum. The water is supplied, for example, from a constant level supply tank 11, with sufficient force or head to cause it to pass through the material and displace the oil, the rate of travel of which is conditioned upon its viscosity. When the melting point of the oil is above normal atmospheric temperature the chamber 5 is heated by means of the jacket 12 and heated water may be used. The use of heat is advantageous in all cases in reducing the viscosity of the oil.

As the water passes through the body of packed oil-bearing material the oil is displaced therefrom and is pushed ahead by the water. The oil is gradually forced out of the material and overflows from the opening or outlet 13, passing through the upper septum. The oil is a clear bright product, the mode of operation automatically filtering and clarifying the material.

With some oil-bearing materials it is advantageous to add to the material next the lower septum a small amount of oil, preferably of the same kind as that contained in the material under treatment, to aid in forming a continuous phase of oil adjacent the septum. It is frequently advantageous to admix with the oil-bearing material some easily dissipated solvent for the oil, prior to the displacement thereof.

The displacing liquid may be water or other liquid such as dilute alcohol, aqueous solution of acid or alkaline materials or salts, etc., the displacing liquid remaining in the oil-bearing material in lieu of the displaced oil. In general the use of fluid which does not diffuse into the oil is preferred, although such liquid may also be employed in the present displacing process without excessive contamination of the oil displaced.

I claim:

1. The process of removing oil from comminuted oil-bearing material which consists in packing said material in a confined body between two porous septums, providing between the particles adjacent one septum a continuous phase of the oil therefrom, and passing a liquid other than the oil of said material through the last-named septum and the oil-bearing material, thereby displacing the oil and forcing it through the oil-bearing material and the opposite septum without substantial admixture with the liquid.

2. The process of removing oil from comminuted oil-bearing material which consists in packing said material in a confined body between two porous septums, providing between the particles adjacent one septum a continuous phase of the oil therefrom, and passing an aqueous liquid through the last-named septum and the oil-bearing material, thereby displacing the oil and forcing it through the oil-bearing material and the opposite septum without substantial admixture with the liquid.

3. The process of removing oil from comminuted oil-bearing material by a displacing liquid which consists in packing said material in a confined body upon a porous septum to prevent displacement of said material, providing a continuous phase of oil in the oil-bearing material adjacent the septum and passing a displacing liquid immiscible with the oil through the septum and the oil-bearing material, thereby physically displacing and removing the oil without substantial admixture with said liquid.

WILLIAM HOSKINS.